May 17, 1960     L. L. RICE     2,936,805
WASHER RETAINER
Filed Dec. 27, 1955

LEONARD L. RICE
INVENTOR.
HUEBNER, BEEHLER, WORREL & HERZIG
ATTORNEYS
By Warren T. Jessup

2,936,805
WASHER RETAINER

Leonard L. Rice, Los Angeles, Calif., assignor, by mesne assignments, to Aeroquip Corporation, Jackson, Mich., a corporation of Michigan Application December 27, 1955, Serial No. 555,455

5 Claims. (Cl. 151—38)

This invention relates to means for retaining washers in position opposite bolt or screw holes.

It is a common practice to place one or more washers over the extended ends of bolts before applying a nut thereto. Such washers may be of the spring type or may be merely flat washers. Conventional usage requires the removal of the washer as a separate part whenever the nut and bolt are removed.

It is an object of this invention to provide means for retaining one or more washers in position opposite or aligned with a bolt hole, so that removal of the washer is not required when the bolt and nut are removed.

It is a further object of this invention to provide such a washer retainer means as may be easily removed from the apparatus, if desired, thereby permitting removal of the washers.

In accordance with these and other objects of this invention which will become apparent hereinafter, a preferred form of the present invention is illustrated in the accompanying drawing wherein.

Figure 1:
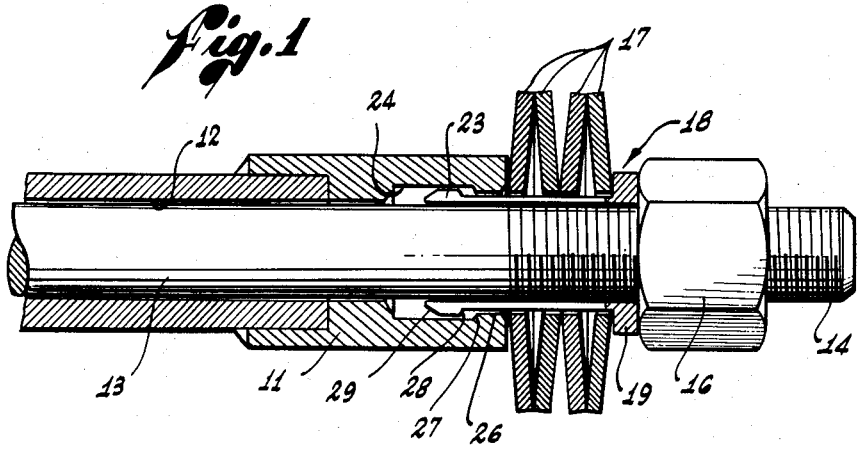
Fig. 1 is a longitudinal section illustrating the retaining means of the present invention in place.
Figure 2:
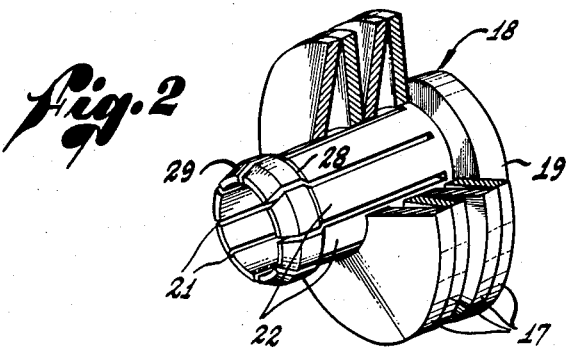
Fig. 2 is a perspective view, quarter-sectioned, illustrating the washer retainer of the present invention with two pairs of washers thereon.

Referring to the drawing, 11 designates a member having a bolt hole 12, through which a bolt 13 is adapted to extend. The member 11 may consist of any apparatus or body having a bolt hole, and in the present instance has been exemplified as a portion of a clamp, such as a coupling clamp as is illustrated and described in U.S. Letters Patent No. 2,659,954, issued November 24, 1953.

To the extended end 14 of the bolt 13 is applied a nut 16. Interposed between the nut 16 and the member 11 are four spring washers 17, known as Belleville spring washers.

In accordance with the present invention, means are provided for holding or securing the washers 17 in position in alignment with the bore 12 in the member 11. This means comprises a collet 18 which is disposed circumjacent the bolt 13. The inner end of the collet 18 extends into the bore 12 and is secured therein by means to be described hereinafter. The outer end of the collet 18 has an outwardly extending shoulder 19. The washers 17 are disposed around the collet 18 between the member 11 and the shoulder 19, which serves to hold the washers 17 in place opposite the bore 12.

The inner end of the collet 18 is split longitudinally, as shown at 21, to provide a plurality of longitudinal fingers 22. The slits 21 extend almost to the shoulder 19, thereby giving long length to the fingers 22. Each finger 22 has an outwardly extending projection or toe 23 which enters into an enlarged portion 24 of the bore 12 in the member 11.

Provision of the enlarged bore portion 24 leaves an inwardly extending shoulder 26 around the bore 12. The inner face 27 on the shoulder 26 thus is in position to engage the face 28 of the projections 23, and serves as a stop to inhibit removal of the collet 18 of the bore 12.

Figure 3:
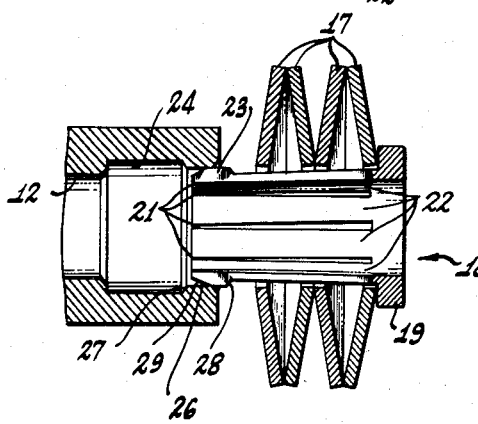
Fig. 3 is a section similar to Fig. 1 showing the washer retainer in process of being installed or removed.

It will be noted that the faces 27 and 28 are beveled in the same direction, so as to form cam surfaces by means of which the collet 18 may be forcibly removed from the bore 12, as shown in Figure 3. Were the faces 27 and 28 to be made normal to the axis of the bolt 13, it would be necessary, for removal, to radially ensmall the collet 18 by pressing inward on the fingers 22, which would be a difficult operation with the washers 17 in place. The wedge surfaces 27 and 28 thus form a convenient vehicle for removal of the collet while still retaining the collet in place during normal use.

For a similar purpose, the opposite faces 29 of the projections or toes 23 are also beveled or cammed, as is the mouth of the bore 12, in order to simplify installation or insertion of the collet 18 in the bore 12.

The collet 18, and particularly the fingers 22 thereof, are made of elastic material, to permit the fingers to press inward during insertion and removal and to spring outward into position in the enlargement 24.

It is desirable to provide for limited axial movement of the collet 18 in the bore 12 while still inhibiting its complete removal from the bore. For this purpose the axial extent of the enlarged portion 24 is greater than the axial extent of the projections 23, thus permitting such limited axial movement of the collet 18. This permits the nut 16 to be screwed in tightly, pressing the collet ahead of it, thereby compressing the spring washers 17 in the well-known fashion. The range of free movement of the collet 18 in the bore 12 is made somewhat greater than the axial movement of the nut 16 required to take up all play in the spring washers 17.

While the instant invention has been shown and described herein in what is conceived to be the most practical and preferred embodiment, it is recognized that departures may be made therefrom within the scope of the invention which is therefore not to be limited to the details disclosed herein, but it is to be accorded the full scope of the claims.

Having thus described my invention, what I claim as new and desire to secure by Letters Patent is:

1. Bolt and washer assembly comprising a body having an outside surface, the body having an inside wall defining a bore extending into the body substantially perpendicular to said outside surface with the bore being open at said outside surface, an enlargement formed in the bore-defining wall and spaced axially inwardly of the outside surface of the body, that end of the enlargement which is proximate said outside surface being an end face facing in a direction inwardly from the bore opening, a bolt disposed axially in the bore and having an outer end portion thereof extending out beyond the outside surface of the body, a collet around the bolt and having an inner end disposed in the bore and an outer end extending out beyond the outside surface of the body, a projection extending radially outwardly from the collet at the inner end of the collet and into said enlargement, the dimension of the projection taken axially of the bore being less than the axial extent of the bore enlargement whereby the collet is slidable axially in the bore, the projection having an end face facing toward said end face of the enlargement for engagement thereagainst to restrain against removal of the collet from the bore, the collet having a shoulder extending radially outwardly from the outer end portion of the collet to define a first surface of the shoulder facing toward the outside surface of the body and a second surface of the shoulder facing axially outward, an enlargement on the outer end portion of the bolt for abutment against said second surface of the collet shoulder to press the collet axially inwardly of the bore, and a washer around the collet and disposed between said first surface of the collet shoulder and the outside surface of the body for being compressed by axially inwardly directed pressure of the bolt enlargement against the collet shoulder.

2. Assembly in accordance with claim 1 in which said bolt enlargement is a nut screw-threaded on the bolt.

3. Assembly in accordance with claim 1 in which said washer is cone-shaped and is taken up axially around said bolt in being compressed.

4. Assembly in accordance with claim 1 in which said collet is cylindrical and the inner end portion thereof is split along a plurality of axially aligned splits to define a plurality of fingers for the collet whereby the inner end of the collet may be contracted to remove the projection out of the bore enlargement.

5. Assembly in accordance with claim 4 in which at least one of said end faces of the enlargement and said end face of the projection is tapered to provide a wedge angle by means of which said fingers may be wedged radially inwardly as the collet is pulled forceably out of said bore.

References Cited in the file of this patent

UNITED STATES PATENTS

| | | |
|---|---|---|
| 1,344,596 | Schaefer | June 22, 1920 |
| 2,320,947 | Martin et al. | June 1, 1943 |
| 2,464,152 | Ralston | Mar. 8, 1949 |
| 2,529,420 | Ramquist | Nov. 7, 1950 |
| 2,672,659 | Becker | Mar. 23, 1954 |
| 2,713,482 | Stapleton | July 19, 1955 |
| 2,766,163 | Schwartz et al. | Oct. 9, 1956 |

FOREIGN PATENTS

| | | |
|---|---|---|
| 1,315 | Great Britain | Jan. 21, 1901 |
| 141,675 | Great Britain | Dec. 16, 1920 |
| 891,650 | France | Dec. 11, 1943 |